(12) United States Patent
Schuster et al.

(10) Patent No.: US 10,243,398 B2
(45) Date of Patent: Mar. 26, 2019

(54) METHOD AND DEVICE FOR MANAGING ENERGY CONSUMPTION OF ENERGY GENERATED FROM A RENEWABLE RESOURCE

(71) Applicant: Fronius International GmbH, Pettenbach (AT)

(72) Inventors: Florian Schuster, Traun (AT); Ernst-Werner Baumgartinger, Ohlsdorf (AT); Markus Brandstoetter, Eggendorf (AT); Andreas Stadler, Wels (AT); Stefan Martetschlaeger, Linz (AT)

(73) Assignee: Fronius International GmbH, Pettenbach (AU)

( * ) Notice: Subject to any disclaimer, the term of this patent is extended or adjusted under 35 U.S.C. 154(b) by 806 days.

(21) Appl. No.: 14/407,718

(22) PCT Filed: Jun. 12, 2013

(86) PCT No.: PCT/EP2013/062192
§ 371 (c)(1),
(2) Date: Dec. 12, 2014

(87) PCT Pub. No.: WO2013/186282
PCT Pub. Date: Dec. 19, 2013

(65) Prior Publication Data
US 2015/0155745 A1   Jun. 4, 2015

(30) Foreign Application Priority Data
Jun. 12, 2012 (AT) .............. A2012/00679

(51) Int. Cl.
*H02J 13/00* (2006.01)
*G05B 19/05* (2006.01)
(Continued)

(52) U.S. Cl.
CPC .......... *H02J 13/0017* (2013.01); *G05B 19/05* (2013.01); *H02J 3/14* (2013.01);
(Continued)

(58) Field of Classification Search
None
See application file for complete search history.

(56) References Cited

U.S. PATENT DOCUMENTS

2006/0276938 A1   12/2006 Miller
2010/0245103 A1    9/2010 Plaisted

FOREIGN PATENT DOCUMENTS

| DE | 102010017264 A1 | 12/2011 |
| DE | 102010040296 A1 | 3/2012 |
| DE | 102010043611 A1 | 5/2012 |

OTHER PUBLICATIONS

European Patent Office, International Application No. PCT/EP2013/062192, International Search Report dated Feb. 17, 2014, 2 pages.

*Primary Examiner* — Eric C Wai
(74) *Attorney, Agent, or Firm* — Moore & Van Allen PLLC; Nicholas C. Russell

(57) ABSTRACT

Device for an energy generation unit of a user's installation, which is connected to an energy supply network and to at least one energy consumption unit of the user's installation and comprises a programmable logic control which controls an internal energy consumption, by the energy consumption units of the user's installation, of the energy generated by the energy generation unit.

23 Claims, 8 Drawing Sheets

(51) Int. Cl.
- *H02J 3/38* (2006.01)
- *H02J 3/14* (2006.01)
- *G05D 3/12* (2006.01)
- *G05D 5/00* (2006.01)
- *G05D 9/00* (2006.01)
- *G05D 11/00* (2006.01)
- *G05D 17/00* (2006.01)

(52) U.S. Cl.
CPC .............. *H02J 3/383* (2013.01); *H02J 3/387* (2013.01); *H02J 2003/143* (2013.01); *Y02B 70/3225* (2013.01); *Y02B 70/3266* (2013.01); *Y02E 10/563* (2013.01); *Y04S 20/222* (2013.01); *Y04S 20/242* (2013.01)

METHOD AND DEVICE FOR MANAGING ENERGY CONSUMPTION OF ENERGY GENERATED FROM A RENEWABLE RESOURCE

CROSS-REFERENCE TO RELATED APPLICATIONS

This application is filed under the provisions of 35 U.S.C. § 371 and claims the benefit of International Patent Application No. PCT/EP2013/062192, filed on Jun. 12, 2013, which claims the benefit of Austrian Application No. A2012/00679, filed in the Austrian Patent Office on Jun. 12, 2012, all of which are hereby incorporated by reference in their entirety.

The invention relates to a method and a device for managing energy generated by an energy unit.

Intelligent energy management is gaining in importance, in particular in relation to resources for obtaining energy. To supply users or consumers with energy, in particular electrical energy, energy is increasingly being generated from renewable resources, predominantly from sunlight, wind power or water power. The energy is increasingly being generated in a decentralised manner, users or consumers not only consuming energy but also actually generating it and feeding it into an energy distribution network or current network. Generated energy which a user or consumer obtains from a renewable energy source and which the respective user does not presently require is fed into an energy distribution network, for example a public low-voltage network. For example, depending on the time of day and the weather conditions, a photovoltaic installation can obtain electrical current from sunlight, which the generating user cannot consume or cannot fully consume at the time it is generated. In many cases, the excess energy cannot be buffered by the user, since the user does not have his own energy store or the capacity of an energy store available to the user is not sufficient to buffer the excess energy fully. In this case, the user feeds the excess energy into the energy supply network and is forced to draw the energy or electric current from the energy supply network at a later time, when his own energy generation unit is no longer supplying sufficient energy for the user's energy consumption units.

An object of the present invention is therefore to provide a method and a device or carrying out energy management for an energy generation unit of an installation of a user, in which the energy generated by the user's installation is sustainably provided in an efficient manner.

This object is achieved according to the invention by a device having the features set out in claim 1.

Accordingly, the invention provides a device for managing energy generated by an energy generation unit of a user's installation, which is connected to an energy supply network and to at least one energy consumption unit of the installation and comprises a programmable logic control which controls an internal energy consumption, by the energy consumption units of the user's installation, of the energy generated by the energy generation unit.

The device according to the invention thus optimises the internal energy consumption of energy generated by an energy generation unit of an installation of the user. This also has the result that the profit of the installation is improved or optimised, since the expensive acquisition of energy is kept to a minimum.

Further, the efficiency of the energy supply system as a whole is advantageously increased with a large number of users, since the energy produced by a user's energy generation unit itself is preferably consumed directly at the site or in the direct vicinity of the generation thereof, in such a way that the total amount of energy transported in the energy system and the accompanying energy transport losses are minimised. It can thus be said that a current exchange of the energy generation unit and the energy supply network is kept to a minimum.

Further, the device according to the invention has the advantage for a user that he becomes more independent of an energy supply from the energy supply network.

In one possible embodiment of the device according to the invention, the energy generation unit of the user's installation obtains energy from a renewable resource.

This renewable resource may be sunlight or hydrogen for a fuel cell.

In a further possible embodiment of the device according to the invention, the programmable logic control actuates the energy consumption units of the user in such a way that, of the energy consumed by the user's energy consumption units, the proportion of energy generated by the user's energy generation unit itself is a maximum.

In a further possible embodiment of the device according to the invention, of the energy generated by the user's energy generation unit itself, the proportion which is not consumed by the user's energy consumption units is fed into the energy supply network or buffered in a local energy store of the user, under the control of the programmable logic control.

In a further possible embodiment of the device according to the invention, the control system is a programmable logic control which executes a stored energy management program.

In a further possible embodiment of the device according to the invention, the stored energy management program is programmable via a programming interface.

In this context, the stored energy management program may be programmed in a text-based programming language.

In a further possible embodiment of the device according to the invention, the stored energy management program is programmed in a graphical programming language.

In one possible embodiment of the device according to the invention, the stored energy management program which is executed by the programmable logic control comprises a text-based instruction list.

In a further possible embodiment of the device according to the invention, the stored energy management program which is executed by the programmable logic control comprises a structured text.

In a further possible embodiment of the device according to the invention, the stored energy management program which is executed by the programmable logic control comprises graphical functional modules.

In a further possible embodiment of the device according to the invention, the stored energy management program which is executed by the programmable logic control comprises a contact plan.

In a further possible embodiment of the device according the invention, the stored energy management program which is executed by the programmable logic control comprises sequential function charts.

In a further possible embodiment of the device according to the invention, the programming interface of the programmable logic control is a local user interface for a user to input the energy management program.

In a further possible embodiment of the device according to the invention, the programming interface of the programmable logic control is a network interface for receiving an energy management program from a remote server.

In a further possible embodiment of the device according to the invention, the energy fed into the energy supply network and energy drawn from the energy supply network are detected by a first detection unit and reported to the programmable logic control of the device.

In a further possible embodiment of the device according to the invention, the energy generated by the energy generation unit is detected by a second detection unit and reported to the programmable logic control.

In a further possible embodiment of the device according to the invention, the energy consumed by the at least one energy consumption unit of the system is detected by a third detection unit and reported to the programmable logic control.

In a further possible embodiment of the device according to the invention, operating data of the energy consumption units are transmitted to the programmable logic control via a data connection for evaluation by the energy management program.

In a further possible embodiment of the device according to the invention, configuration parameter data of the energy consumption units are inputted or transmitted via the programming interface of the programmable logic control for evaluation by the energy management program.

In a further possible embodiment of the device according to the invention, a direct current generated by the energy generation unit is converted by a DC/AC converter of the device into a single-phase or multi-phase alternating current, which is applied by the device to the energy consumption units of the user's installation to supply them with energy via at least one current supply line.

In a further possible embodiment of the device according to the invention, the energy management program executed by the programmable logic control temporally controls switching devices, which are provided between the current supply lines and the energy consumption units, in such a way that, of the energy consumed by the user's energy consumption units, the proportion of energy generated by the user's energy generation unit itself is a maximum.

The invention further provides a photovoltaic installation comprising at least one device provided therein for managing energy generated by at least one energy generation unit of a user's installation, which is connected to an energy supply network and to at least one energy consumption unit of the installation and comprises a programmable logic control which controls an internal energy consumption, by the energy consumption units of the user's installation, of the energy generated by the energy generation unit.

In one possible embodiment of the photovoltaic installation according to the invention, the device provided therein is a photovoltaic inverter comprising an integrated programmable logic control which is connected to a solar module of the photovoltaic installation.

The invention further provides a method having the features set out in claim 18.

The invention accordingly provides a method for carrying out energy management for an energy supply unit of a user's installation, which generates energy for feeding into an energy supply network and for supplying the internal energy consumption units of the user's installation, an internal energy consumption of the generated energy being set by the energy consumption units of the user's installation.

In one possible embodiment of the method according to the invention, of the energy consumed by the user's energy consumption units, the internal energy consumption of the generated energy is automatically maximised.

In a further possible embodiment of the method according to the invention, the internal energy consumption is set by the user's energy consumption units using an energy management program which is executed by a programmable logic control.

In the following, possible embodiments of the device according to the invention and the method according to the invention for carrying out energy management for an energy generation unit of an installation of a user are described in greater detail with reference to the accompanying drawings.

Figure 5:
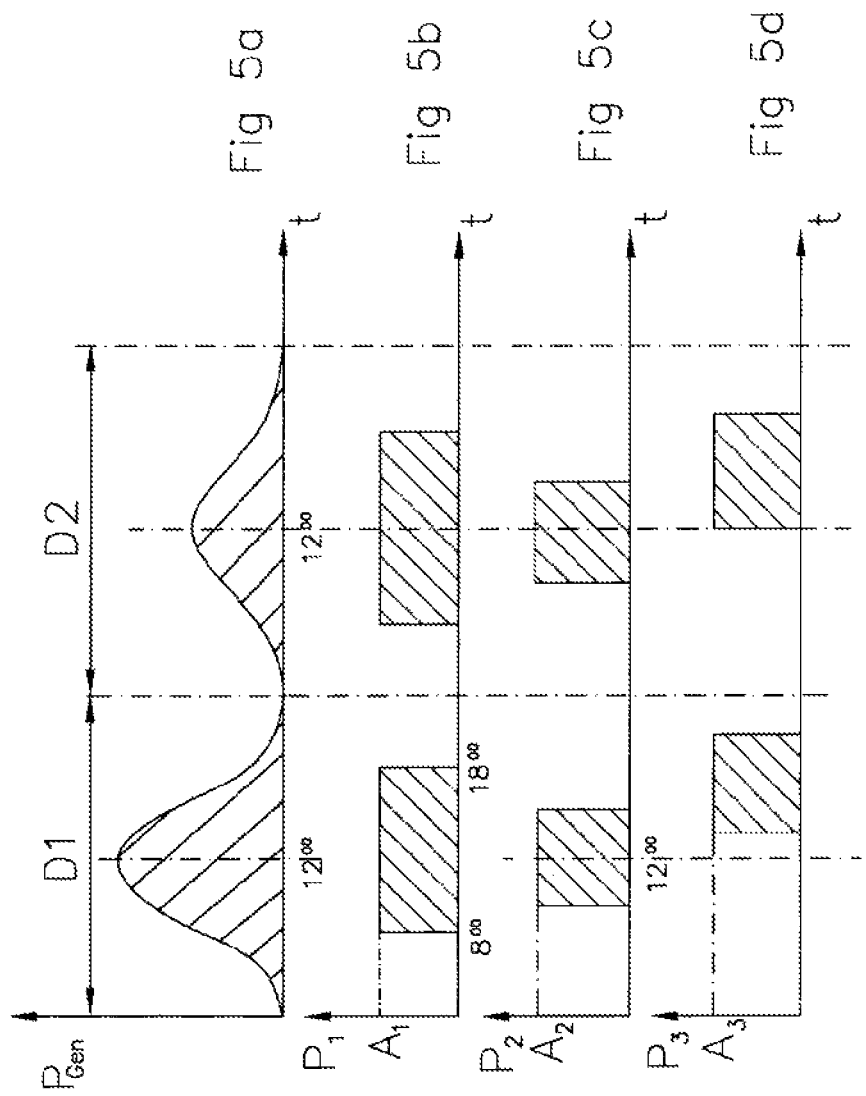
Figure 6:
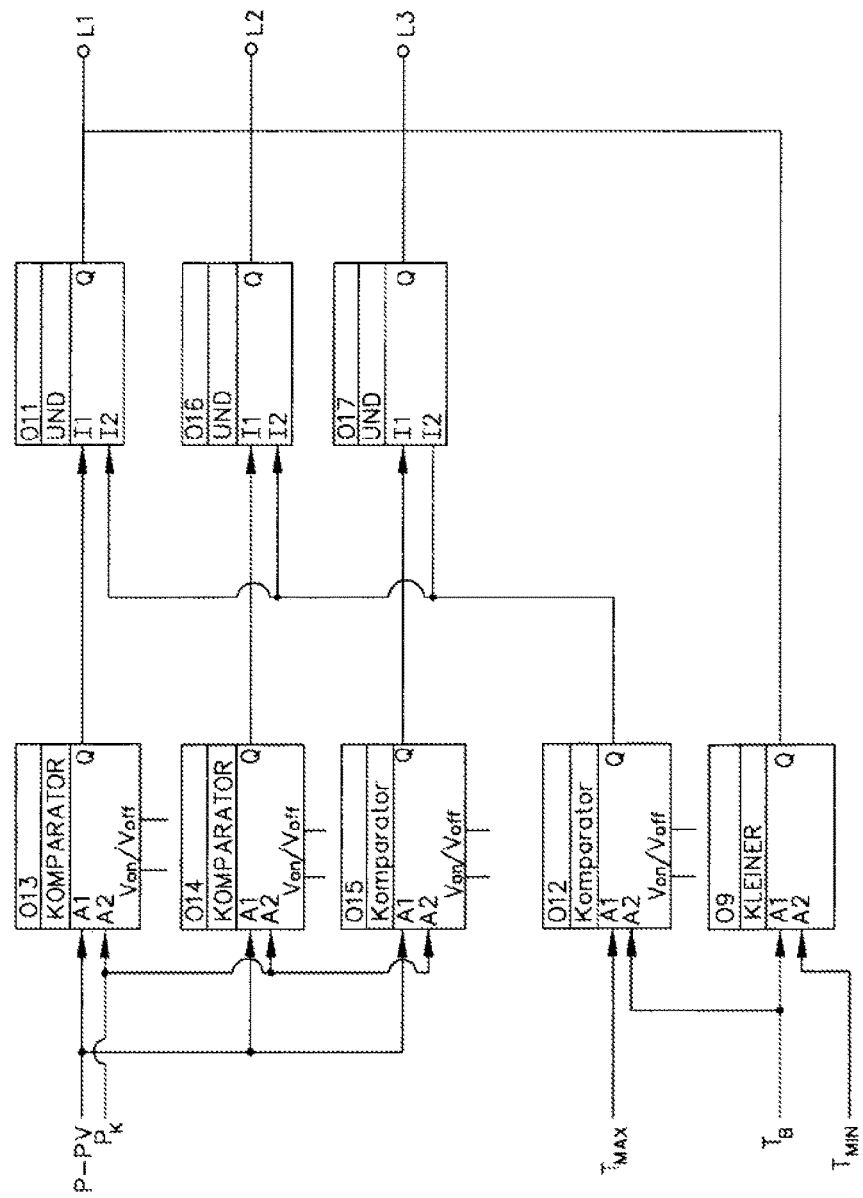
Figure 7:
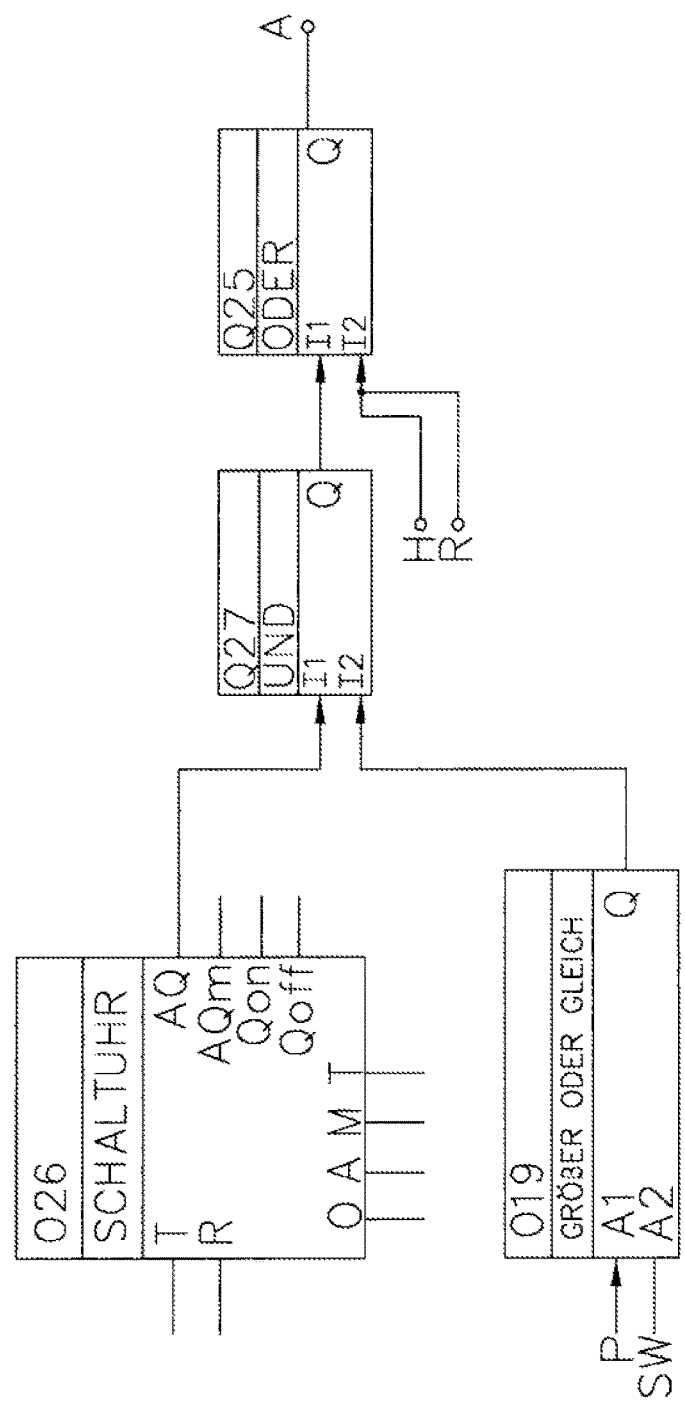
Figure 8:
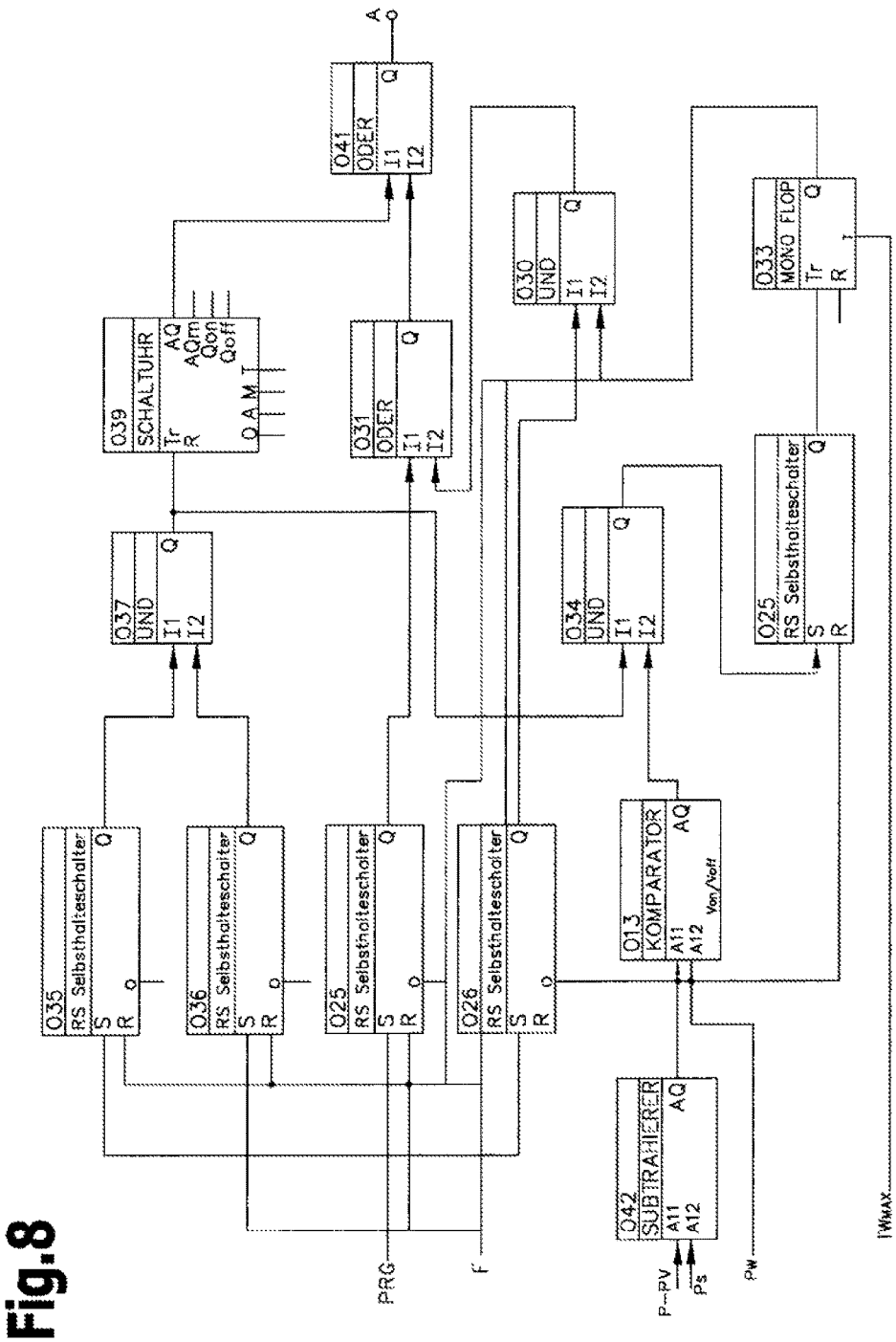

FIG. 5 consists of diagrams illustrating the mode of operation of the device according to the invention for carrying out energy management by way of an example application;

FIG. 6 is a functional circuit diagram as an example application of an energy management program of the type which can be used in the device according to the invention and the method according to the invention to carry out energy management;

FIG. 7 is a further functional circuit diagram as an example application of an energy management program of the type which can be used in the device according to the invention and the method according to the invention to carry out energy management; and FIG. 8 is a further functional circuit diagram as an example application of an energy management program of the type which can be used in the device according to the invention and the method according to the invention to carry out energy management.

Figure 1:
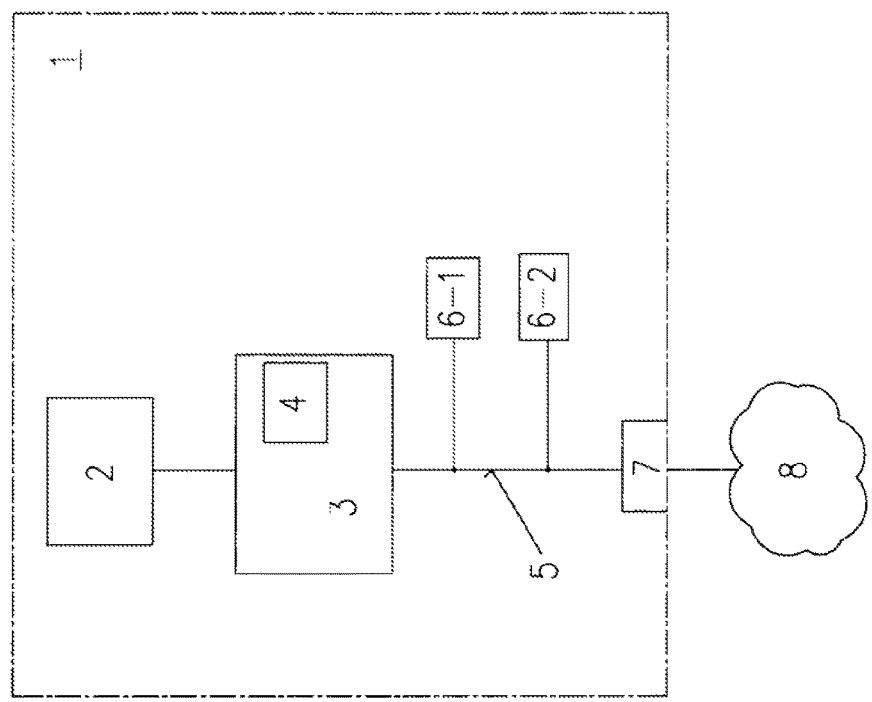
FIG. 1 is a block diagram illustrating an embodiment of a device according to the invention for carrying out energy management.

As can be seen from FIG. 1, the installation 1 shown therein of a user comprises an energy generation unit 2 which generates energy from a renewable resource. The energy generation unit 2 may for example generate energy from sunlight by means of solar modules. The energy generation unit is connected to a device 3 for carrying out energy management for the energy generation unit 2. The device 3 comprises a programmable logic control 4 integrated into it, as shown in FIG. 1. The device 3 is connected to energy consumption units 6-1, 6-2 of the user's installation 1 via local energy supply lines or current lines of a local current supply network 5. Further, the device 3 is connected to an energy supply network 8 via a network connection 7. The number N of energy consumption units 6-i within the installation 1 of a user may vary. The installation 1 is for example a user's private home, and comprises household appliances, for example a washing machine, an electric boiler and other devices, for example pumps or the like, as energy consumption units 6. Further, the installation 1 may also be the installation of a business which obtains energy from renewable resources locally by means of an energy generation unit 2 and operates work machines of the business as energy consumption units 6-i. Further typical examples of a user's energy consumption units 6-1 are air-conditioning systems, electrical heating appliances, dishwashers, electric stoves and the like. The energy generation unit 2 may for example be one or more solar modules which generated a direction current DC from sunlight and supply it to an inverter 3, which has a programmable logic control 4 integrated into it. The direct current supplied by the solar module 2 or the supplied direct voltage can be converted into an alternating voltage of for example 230 V by means of a DC/AC module within the inverter 3. This alternating voltage or alternating current AC serves to supply the energy consumption units 6-$i$ of the installation 1 with energy, and can be coupled into the energy supply network 8 via the network connection 7 if there is no need for energy. An AC output of the inverter 3 or the DC/AC converter integrated into it is connected to the energy supply network 8 via the local energy supply lines 5 and the network connection 7, and provides a single-phase or multi-phase supply alternating current AC. The network connection 7 may also be formed by a network supply unit or network transmission unit, which for example collects the AC outputs of a plurality of inverters 3 and passes them on together to the energy supply network 8.

The solar or photovoltaic module 2 converts sunlight into electrical energy, the solar module consisting of solar cells connected in series or in parallel. From the supplied direct current, the inverter 3 generates a single-phase or three-phase alternating current or rotary current. The inverter 3 has the purpose of making the obtained direction current usable by the local electrical energy consumption units 6-$i$ of the user's installation as alternating current AC.

In the embodiment shown in FIG. 1, a programmable logic control 4 is integrated into the device 3 or the inverter 3. The programmable logic control 4 controls the energy consumption units 6-$i$ of the user's installation 1 in such a way that, of the energy consumed by the energy consumption units 6-1 of the user's installation 1, the proportion of energy generated by the energy generation unit 2 of the user's installation 1 itself is a maximum. In one possible embodiment of the device 3 according to the invention, of the energy generated by the energy generation unit 2 of the user's installation 1 itself, the proportion which is not consumed by the energy consumption units 6-$i$ of the user's installation is fed into the energy supply network or alternatively buffered in a local energy store of the user's installation, under the control of the programmable logic control 4 of the device 3.

In a preferred embodiment of the device 3 according to the invention, the programmable logic control 4 integrated into the device 3 executes a stored energy management program which is programmed in a text-based or graphical programming language via a programming interface.

In a possible variant configuration, the energy management Program provided in the memory-programmable logic control 4 is a text-based instruction list AWL. Alternatively, the stored energy management program may also be a structured text ST which is programmed in a structured control language SCL. In a further possible variant configuration of the device 3 according to the invention, the stored energy management program is programmed in a graphical programming language. In one possible embodiment, the stored energy management program which is implemented by the programmable logic control 4 comprises a contact plan KOP. In a further possible variant configuration of the device 3 according to the invention, the stored energy management program which is executed by the programmable logic control 4 comprises sequential function charts SFC. In a further possible embodiment of the device 3 according to the invention, the stored energy management program which is executed by the programmable logic control 4 comprises graphical functional modules FBS or functional block diagrams FBD. In one possible variant configuration of the device 3 according to the invention, it may execute energy management programs which are in different programming languages, for example test-based or graphical programming languages. In one possible variant configuration, the device according to the invention may execute text-based energy management programs which are in programming languages such as C, JAVA or SCRIPT.

In one possible embodiment of the device 3 according to the invention, it comprises a programming interface for the programmable logic control 4. This programmable interface may be a local interface for a user or installer of the installation 1 to input the energy management program. Likewise, the energy management program can be transmitted to the programmable logic control 4 via what are known as portable media, such as a USE stick or an SD card. Further, the programmable interface may comprise a network interface for receiving the energy management program from a remote server.

The energy fed into the energy supply network 8 and energy drown from the energy supply network 8 by the installation 1 can be detected by an energy detection unit, in particular an electricity meter or a smart meter, and reported to the programmable logic control 4 of the device 3. In a further possible variant configuration, the energy generated by the energy generation unit 2, for example the electric current generated by a solar module, is detected by a second detection unit or an electricity meter and likewise reported to the programmable logic control 4 of the device 3. In this variant configuration, the installation 1 thus comprises a production meter to detect the energy produced and a feed-in meter to detect the energy fed into the energy supply network 8. The feed-in meter may be located for example in the network connection of the installation 1. The production meter detects the energy input of the energy generation unit 2, in other words for example the solar current produced therein. The current not required by the energy consumption units 6-$i$ is fed into the energy supply network 8. The difference between the current detected by the production meter and the current detected by the feed-in counter gives the internal energy consumption of the user's installation 1.

In a further possible embodiment of a device 3 according to the invention, the energy consumed by at least one energy consumption unit 6 of the user is detected by sensor by a third detection unit or an electricity meter, and likewise reported to the programmable logic control 4 of the device 3. In one possible variant configuration, each energy consumption unit 6-$i$ of the user has its own energy detection unit, which detects the energy consumption of the respective energy consumption unit 6 by sensor and reports it to the programmable logic control 4. Alternatively, a detection unit may be provided which detects the total energy consumption of all of the energy consumption units 6-$i$ of the installation 1 and transmits them to the programmable logic control 4 for evaluation.

In a further possible embodiment, the operating data of the energy consumption units 6-$i$ are transmitted to the programmable logic control 4 of the device 3 via a data connection for evaluation by the energy management program. The data connection may be a local data bus of the installation 1. In a further possible embodiment of the device 3 according to the invention 3, configuration parameter data of the energy consumption units 6-$i$ are additionally inputted via the programmable interface of the programmable logic control 4 for evaluation by the energy management program executed therein.

In one possible embodiment of the device 3 according to the invention, the energy management program executed by the programmable logic control 4 controls switching devices which are provided between the current supply lines 5 and the energy consumption units 6. These switching units are preferably controlled by the programmable logic control 4 in such a way that, of the energy consumed by the energy consumption units 6 of the installation 1, the proportion of energy generated by the energy generation unit 2 of the installation itself is a maximum. As is shown in FIG. 1, the local energy supply network or the current supply lines 5 may comprise one or more phase lines. In one possible variant configuration, the energy consumption units 6-i of the installation 1 are household appliances, which are plugged into a conventional socket of a household power network of a private home or the like by way of an adapter. In each adapter device, there may be a switching device, which switches one or more phase lines L as a function of control commands received by the respective switching device from the programmable logic control 4 of the device 3.

In the embodiment shown in FIG. 1, the programmable logic control 4 is integrated into the device 4 is integrated into the device 3, in particular into the inverter 3 of the installation 1.

The device 3 which carries out the energy management for the energy consumption units 6 need not necessarily being provided in an inverter 3 of the installation 1, but may be provided in any system component of the installation 1. For example, the device for carrying out energy management of energy generated by an energy generation unit of the user or by the installation 1 may also be integrated into the network connection 7, a string control known from the art, or a similar component of the installation 1—in other words into a system component of the installation 1.

Figure 2:
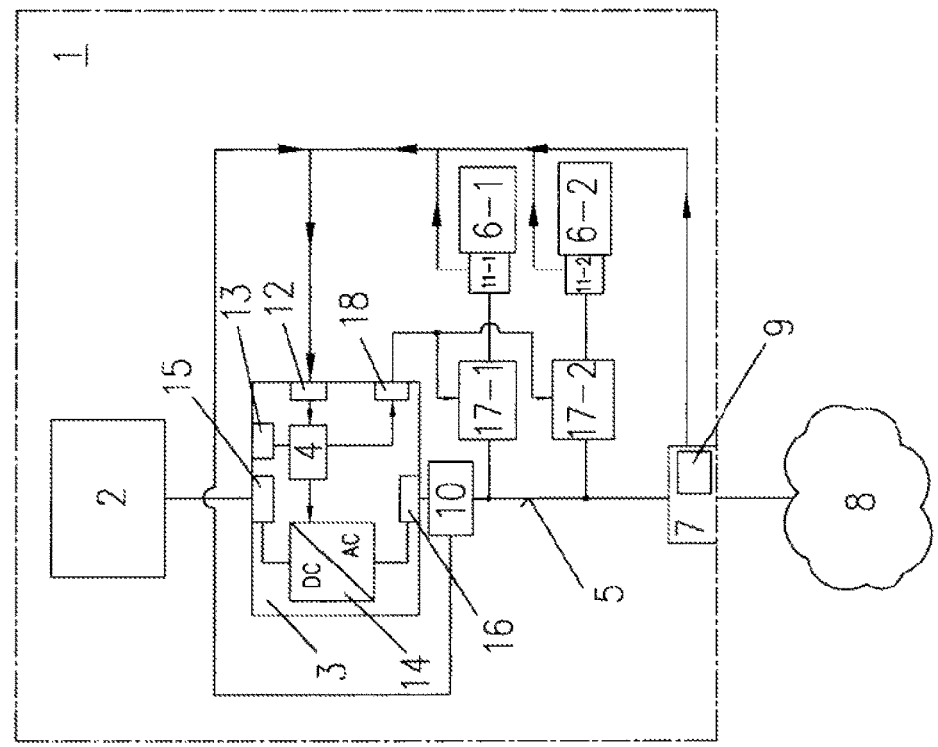
FIG. 2 is a block diagram illustrating a further embodiment of a device according to the invention for carrying out energy management.

FIG. 2 shows a further embodiment of a user's installation 1 having a device 3 provided therein for carrying out energy management for an energy generation unit 2 of the installation 1. In the embodiment shown in FIG. 2, there is an inverter 3 having a programmable logic control integrated into it which carries out an energy management program so as to control or set the internal energy consumption, by the energy consumption units 6 of the installation 1, of the energy generated by the energy generation unit 2. Of the consumed energy consumed by the energy consumption units 6-1, 6-2 of the user's installation 1, the proportion of the energy generated by the energy generation unit 2 of the user's installation 1 itself is maximised. The energy fed into the energy supply network 8 by the installation 1 and the energy drawn from the energy supply network 8 by the installation 1 are detected by a first detection unit 9 and reported to the programmable logic control 4 of the device 3 via a data connection. In the embodiment shown in FIG. 2, the first detection unit or the electricity meter 9 is integrated into the network connection 7 of the installation 1. Further, in the embodiment shown in FIG. 2 there is a second detection unit 10 which detects AC generated by the device 3 and reports it to the programmable logic control 4 via a data connection. Naturally, the detection unit 10 may also be arranged upstream from the device 3, in other words on the DC side, and detect the current $I_{DC}$ generated by the energy generation unit 2 by sensor. Further, the various energy consumption units 6-i of the user or of the installation 1 each comprise a detection unit 11-1, 11-2 which reports the energy consumed by the respective energy consumption unit 6-i to the programmable logic control 4 of the device 3 via a data connection. Naturally, the detection unit 1-i may also be arranged upstream and/or downstream from the energy consumption units 6-i and a shared detection unit 11 for the energy consumption units 11 may be provided. The detection units 11-i may also be integrated into a system component of the installation 1. The various detection units or sensors 9, 10, 11 may be connected via a shared data connection, for example a data bus, to a data interface 12 of the device 3, as is shown in FIG. 2. In particular, the number and arrangement of the detection units are adapted individually to the requirements of the energy consumption units 6. Further, in the embodiment shown the device 3 comprises a programmable interface 13 via which an energy management program can be inputted into the memory-programmable logic control 4 of the device 3. By means of this programmable interface 13, for example a local user interface, a user U, for example an installer, can input an energy management program into the programmable logic control 4. The programmable logic control 4 executes the inputted and stored energy management program and controls the energy consumption units 6-i accordingly.

For this purpose, in the embodiment shown in FIG. 2, controllable switching devices 17-1, 17-2 are provided in each case between the current supply lines 5 of the energy consumption units 6-i, and are actuated by the programmable logic control in such a way that, of the total consumed energy consumed by the energy consumption units 6-i of the user's installation, the proportion of energy generated by the energy generation unit 2 of the user's installation 1 is a maximum. The switching devices 17-1, 17-2 contain switches integrated into them, which are actuated for example by a control signal CTRL emitted by the programmable logic control 4 to the switching devices 17-1, 17-2 via a control interface 18. In one possible variant configuration, the switching devices 17-1, 17-2 may be contained in adapter switching devices, which are plugged into conventional sockets of a household or private home and serve as adapters for household appliances 6-1, 6-2. In one possible variant configuration, the control signals CTRL or actuating the switching devices 17-1, 17-2 can be transmitted by the programmable logic control 4 via a remote interface. Further, the energy consumption units 6-1, 6-2 of the installation 1 may have current consumption sensors 11-i integrated into or attached to them, which report the respective energy or current consumption to the programmable logic control 4 of the device 3 via a remote interface. The supply to the energy consumption units 6 may be provided via a DC/AC module 14, which is integrated into the device 3 and which converts the direct current DC applied to a DC interface 15 of the device 3 by the energy generation unit 2 into an alternating current AC, which is supplied to the energy consumption units 6-i via an AC interface 16 of the device 3 and via local current supply lines 5 of the installation 1. In this regard, it should be noted that the DC/AC module 14 is mentioned as an example of a type of inverter 3. Other types are for example inverters without transformers, which are known in detail from the prior art.

Figure 3:
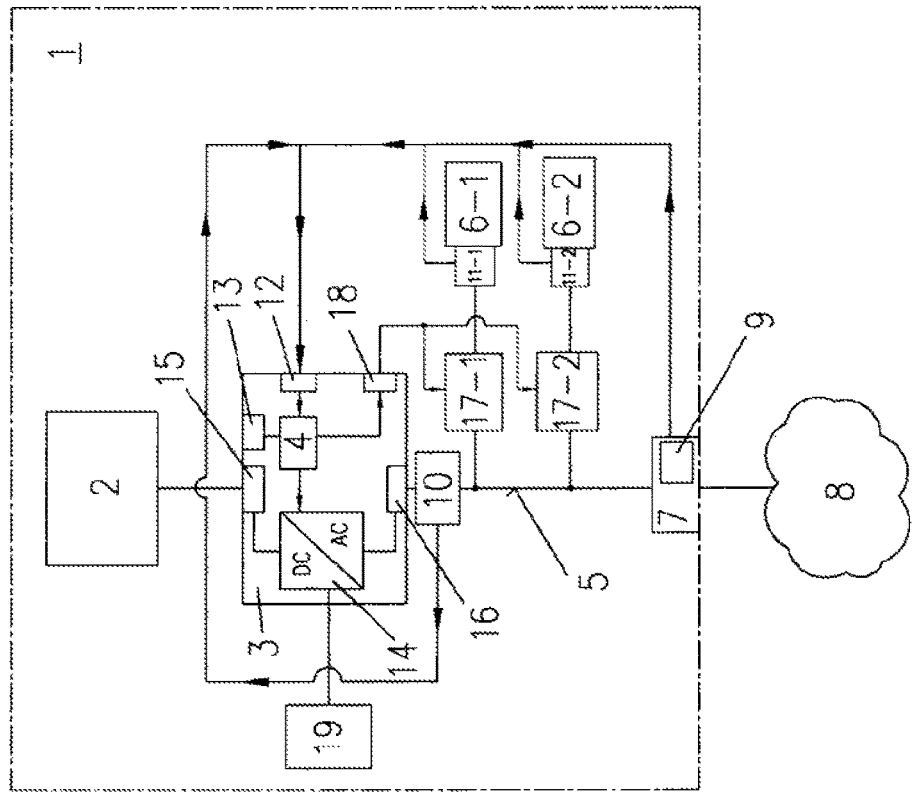
FIG. 3 is a block diagram illustrating a further embodiment of a device according to the invention for carrying out energy management.

FIG. 3 shows a further embodiment of a device 3 according to the invention for carrying out energy management of an energy generation unit 2 of a user or of an installation 1. In this variant configuration, the installation 1 additionally comprises a local energy store 19, for example a battery or a fuel cell, to which the device 3 can be connected. The energy store 19 serves to buffer energy. In one possible variant configuration, of the energy generated by the energy generation unit 2 of the user's installation 1 itself, the proportion which is not consumed by the energy consumption units 6-i of the user's installation 1 is fed into the energy supply network 8 or buffered in the local energy store 19 of the installation 1, under the control of the programmable logic control 4. In one possible variant configuration, the energy is fed into the energy supply network 8 when the local energy store 19 has no more storage capacity or is full. In a further possible variant configuration, by way of a corresponding input via his user interface, the user U can switch into an island operating mode, in which the installation 1 is separated from the energy supply network 8 and the excess energy is buffered in the local energy store 19. In one possible variant configuration, the installation 1 is switched into the island operating mode automatically, for example if the energy supply network 8 fails or corresponding interferences occur. In one possible variant configuration, the programmable logic control 4 obtains configuration parameter data of the various energy consumption units 6-i of the installation 1 of the user via an interface, for example via the user interface 13. Further, the programmable control system 4 can obtain operating data of the energy consumption units 6-i via a data connection, for example a remote interface or the like. In a further possible variant configuration, the programmable logic control 4 of the device additionally obtains configuration parameter data and operating data of the local energy store 19 which is connected to the device 3. Likewise, the operating data—for example a current detection of the energy consumption units—may also be collected in a data unit of the installation which can be accessed by the programmable control unit 4. In this case, the operating data thus reach the programmable logic control via the data unit.

Figure 4:
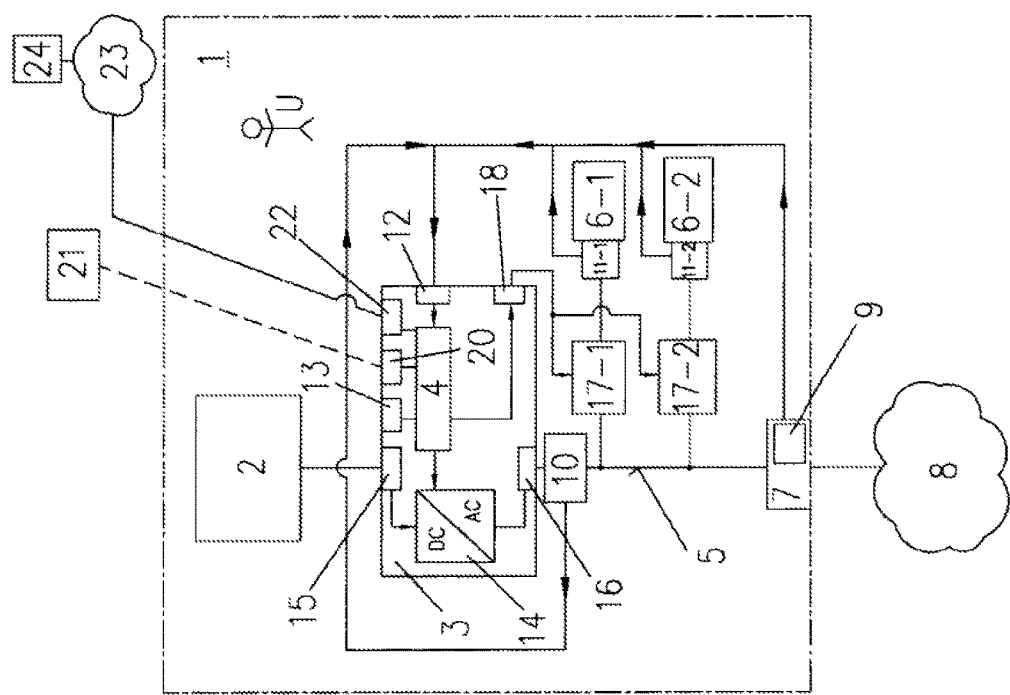
FIG. 4 is a block diagram illustrating a further embodiment of a device according to the invention for carrying out energy management.

FIG. 4 is a block diagram illustrating a further embodiment of the device 3 according to the invention for carrying out energy management. In the embodiment shown in FIG. 4, as well as the user interface 13, the device 3 additionally has a remote interface 20—for example WLAN—or another data interface to an external programming device 21 which transmits a programmed energy management program to the programmable logic control 4 via the interface 20. In this way, a programmer or user, for example an installer or the like, can comfortably program an energy management program in a text-based or graphical programming language and transmit it to the programmable logic control 4 of the device 3, for example an inverter. The programming device 21 may be a laptop or another mobile terminal, in particular including a smartphone.

In the embodiment shown in FIG. 4, the device 3 further additionally comprises a network interface 22—for example Ethernet—which is connected to a local data network 23, for example a local data network of a business. A server 24 can be connected to the data network 23. In one possible variant configuration, the programmable logic control 4 downloads an energy management program from a database server 24. In one possible embodiment, the data network 23 is the Internet. In this variant configuration, a corresponding energy management program can be downloaded by a user U from a database 24 to operate is installation 1, for example at the request of the programmable logic control 4. In this variant configuration, the energy management program can be generated and programmed, for example by the programmer of a service provider, and made available to the user U for his installation 1. After the request to download the energy management program, the programmable logic control 4 of the device 3 can make additional information available to the database server 24, which said server takes into account for the provided or programmed energy management program. These additional information data may for example comprise configuration parameter data of the energy consumption units 6-i or of the energy storage units 19 of the installation 1. Further, for example displayed operating data of the energy consumption units 6-i which have been reported to the programmable logic control 4 in the operation of the installation 1 thus far can be transmitted to the database server 24. The data which can be transmitted to the database server 24 by the device 3 also include for example position data or coordinates of the installation 1 of the user U. For example, on the basis of the geographical position of the installation 1, predictions can be made about current levels which can be generated by a photovoltaic installation 2 of the installation 1. Further, the database server 24 can also take into account data from further servers, for example server which supply weather forecast data. The data generated by the energy detection units, in particular by the current production meter 10, can be taken into account by the energy management program.

The interfaces 13, 20 and 22 may also optionally be combined into a single interface.

In one possible embodiment of the device 3 according to the invention or method according to the invention for carrying out energy management, on the basis of the available data which are supplied by the sensors or energy detection units, can be evaluated to calculate simulation results by way of a current consumption or energy consumption by the energy consumption units 6-i of the installation 1 to be expected in the near future, in such a way that an internal energy consumption, by the energy consumption units 6-i of the user's installation 1, of the energy generated by the generation unit is calculated in advance by the energy management program and controlled accordingly. Additional configuration parameter data, for example energy production data of the installation 1 or weather forecast data which are obtained from a server 24, may additionally be taken into account in the forecast or simulation.

FIG. 5 shows diagrams illustrating an example application for a method for carrying out energy management according to the invention. FIG. 5a is a diagram illustrating the progression over time of energy generated by an energy generation unit 2 of the installation 1. In the example shown, the energy generation unit 2 is a solar module which generates electrical power P or electrical energy E as a function of sunlight over the course of the day. Typically, the energy or power generated by a solar module is relatively high at midday and 0 at night. The maximum of the energy generated by the photovoltaic module 2 is therefore at midday, 12.00, in the example shown in FIG. 5. Depending on the weather, the amplitude A or the current maximum and the shape of the generated energy characteristic may vary over the course of the day, as indicated in FIG. 5a. In the example shown in FIG. 5a, the sky is cloudy on day 2 (D2), in such a way that the generated energy of the photovoltaic module 2 is less than on the sunny day 1 (D1).

FIG. 5b, 5c, 5d show by way of example the energies consumed by various energy consumption units 6-i of the installation 1, which have a different progression depending on the type of energy consumption unit. For example, FIG. 5b shows the progression over time of the energy or power consumption of a machine which is operated continuously by a user during working hours, in other words from 8:00 in the morning until 18:00. FIG. 5b shows a typical energy or power consumption of a kitchen or canteen which is mainly operated at midday. FIG. 5d shows by way of example the current or energy consumption by a washing machine which the user uses in the afternoon. The energy management program according to the invention controls the internal energy consumption of the energy generated by the energy generation unit 2, as shown in FIG. 5a, in such a way that the total of the energy consumed by the energy consumption units 6-i is as coincident as possible with the generated energy progression, in other words, of the energy consumed by the energy consumption units 6, the proportion of energy generated by the energy generation units 6 of the user himself is a maximum. The various energy consumption units 6-1 have different consumption amplitudes A and current consumption times. The current consumption times or current consumption periods may be predetermined in a relatively fixed manner as a function of the type of consumption units 6-i or may vary. For example, the operating time of the kitchen or canteen is relatively fixed, since the kitchen has to be operated at midday. By contrast, the operating time of the washing machine is relatively variable, since it is largely irrelevant to the user at what time the washing machine is operated to wash the laundry once it has been filled. Therefore, the energy management program according to the invention can actuate the washing machine in such a way that the total energy consumption of all of the energy consumption units 6-i of the installation is made as coincident as possible with the progression of the energy generated by the energy generation unit 2. The surface integral of the energy generated by the energy generation units is preferably brought into coincidence, in so far as possible, with the surface integral of all of the energy consumption units 6-1 of the installation 1 which are connected to the device 3, so as to maximise the internal energy consumption of the user U.

Depending on environmental influences, in particular weather influences, the progression of the energy generated by the energy generation unit 2 may vary, as is shown in FIG. 5a. Over the course of the day, the energy management program can control or regulate an energy consumption by energy consumption units 6 largely freely for many types of energy consumption units, for example washing machines or the like, without the result of the work or the functionality of the respective energy consumption unit 6 suffering as a result. For example, the energy management program may introduce a washing process in the morning, at midday or in the afternoon, depending on how much energy the energy generation unit is currently supplying.

In some energy consumption units 6, the current consumption or power can be set or controlled continuously by the energy management program. For example, this can take place by way of a pulse-width modulation of the charging current of a battery or by regulating the power of a heating rod.

Further, from an energy consumption recorded in the past and from forecast data, for example weather forecast data, the energy management program may also forecast an energy generation progression to be expected for the next day and actuate the energy consumption units 6 appropriately in such a way that the internal energy consumption is a maximum. In the example shown in FIG. 5a of an energy generation unit 6 which obtains energy from sunlight, the energy generation progresses periodically with a period of 24 hours. In other energy generation units 2, the energy generation tales place relatively irregularly as a function of weather conditions, for example in the generation of energy from wind power. In further energy generation units 2 from renewable resources, for example water power, the energy production progresses relatively constantly.

In a further possible embodiment of the device 3 according to the invention, the installation 1 comprises a plurality of energy generation units 2, which supply the energy from various controllable resources, for example sunlight, wind power or water power. The energy obtained from the different resources forms an aggregated energy generation curve, in which the differently generation energy progressions are superposed. In this variant configuration, the programmable control system 4 controls the internal energy consumption of the energy generated by the various energy generation units 2-i by way of the energy consumption units 6-i, preferably in such a way that, of the energy consumed by the various energy consumption units 6-i of the user's installation 1, the proportion of the energy generated in total by the user's installation is a maximum. In a possible variant of the device 3 according to the invention and of the method according to the invention for carrying out energy management, the internal energy consumption of the installation 1 of the generated energy is displayed to the user U via an interface, for example a graphical display or the like.

In the following, example applications of the method according to the invention and the device 3 according to the invention for carrying out energy management are disclosed by way of example energy management programs, which are programmed in a graphical programming language. The energy management programs comprise functional modules FBS or functional block diagrams FD in accordance with EN 61131-3, which is a standard for programming languages of programmable logic controls.

FIG. 6 shows a functional circuit diagram for an electric boiler heating system, which is operated as an energy consumption unit 6 in an installation 1 of a user U. The boiler heating system is a three-phase boiler cartridge, the three phases L1, L2, L3 of which are actuated individually by the programmable logic control 4 and for example each consume two kW. As is shown in FIG. 6, an electrical power P-PV, for example a power supplied by a photovoltaic installation 2, which by means of comparators which are shown as functional modules O13, O14, O15, is compared with a consumed power $P_k$ supplied by an electrical consumption meter, for example having an S0 output. The electrical power may for example be generated directly by an inverter 3. Further, in the embodiment shown of an electric boiler heating system which forms an electrical consumption unit 6 of the installation 1, a temperature sensor is provided for measuring the boiler temperature $T_b$. In the embodiment shown in FIG. 6 of an energy management program, the boiler heating is intended, around the clock or constantly, to have a minimum temperature $T_{min}$ of 45° C. and for calcination reasons to have a temperature not exceeding a maximum temperature $T_{max}$ of 65° C. The boiler heating system is operated in such a way that it is operated using a current supplied by the photovoltaic module 2 in so far as possible. As can be seen from FIG. 6, in the embodiment shown, the energy management program can control various phases L1, L2, L3 of the energy consumption unit 6, in other words of the boiler heating system, of the user U separately.

FIG. 7 is a diagram illustrating a further example application for an energy management program which can be used in the method according to the invention. FIG. 7 is a functional circuit diagram comprising a plurality of functional modules FBS of an energy management program for a swimming pool pump 6 of an installation 1. The example embodiment shown is thus an energy consumption unit 6 in which the time at which the energy consumption unit 6 is operated plays a subordinate role. As is shown in FIG. 7, the inverter 3 of the installation 1 provides the currently generated power value P. By way of a configurable threshold SW in the programmable logic control 4, one or more energy consumption units 6 can be actuated for internal consumption optimisation. By way of a comparator 019, the current power of the energy consumption unit 6 and the threshold SE are compared with one another. If the power of the energy consumption unit 6, in other words the swimming pool pump, is greater than or equal to the set threshold SE, the energy generation unit 2 of the installation supplies sufficient energy and the swimming pool pump can in principle be operated as an energy consumption unit 6. In the example application shown, the output of the comparator 019 is linked to a functional module 027, which implements a logical AND link to a time signal supplied by a clock timer acting as a functional module 026. By means of the clock tie 026, it is possible for the user U to set any desired time specification. For example, the user U can set a time window between a clock time of 6:00 and 18:00, it being possible to operate the swimming pool pump 6 in this time window. Further, in the example application shown, by means of the energy management program there is also the possibility of switching on the energy consumption unit 6, in other words the swimming pool pump 6, manually. For this purpose, an internal input "manual actuation" H is provided at an OR functional module 025, via which the swimming pool pump 6 can be activated. A further input of the functional module shown in FIG. 7 serves as an input for a ripple control receiver R, which provides the option of switching the swimming pool pump 6 on and off via an output A if it is necessary not to feed anything into the energy supply network 8.

FIG. 8 shows a further functional circuit diagram for a further example application of an energy management program for operating a washing machine as an energy consumption unit 6. In the embodiment shown, the energy management program ensures that the washing machine is supplied with as much photovoltaic current as possible, which is generated by a photovoltaic installation 2, so as to increase the internal energy consumption of the photovoltaic installation 2. If the photovoltaic current does not appear during the day, for example because of poor weather, the washing machine is nevertheless operated in such a way that laundry washed by the washing machine has finished washing by the evening. For example, in one application scenario the washing machine, acting as an energy consumption unit 6, is loaded with laundry and filled with detergent on the morning of the day or on the evening of the previous day. Subsequently, the washing machine should have finished washing the laundry by the evening of the washing day. In the example application shown in FIG. 8, in accordance with the programmed energy management program, the washing machine, acting as an energy consumption unit 6 of the installation 1, accordingly does not start the washing process simply by applying the energy supply. The sequence for starting the washing machine progresses in such a way that the washing machine is only supplied with current or energy once a start button on the washing machine is additionally actuated so as to start the washing process. The washing machine can be started manually at the respective appliance. When the washing machine begins to start the wash program thereof in accordance with the control by the energy management program, the supply to the washing machine can be interrupted. A majority of currently existing washing machines interpret this situation as a loss of power. When the current supply is applied again, the washing machine continues the wash program thereof.

As can be seen from the example application in FIG. 8, the required input variables of the energy management program are formed by the power uptake $P_w$ of the washing machine acting as an energy consumption unit 6, the photovoltaic current capacity P-PV of the energy generation unit 2, the energy consumption $P_s$ by other or remaining energy consumption units 6 of the installation 1, and for example a maximum washing duration $T_{wmax}$ of the washing machine. Further inputs are a first input PRG, which makes it possible to program the washing machine, and a second input F to release the washing process of the washing machine. The output A of the energy management program shown in FIG. 8 makes it possible to switch the washing machine, acting as an energy consumption unit 6, on or off by means of a contactor or relay, acting as a switching unit.

Further variants of the method according to the invention and the device 3 according to the invention for carrying out energy management are possible. For example, the device 3 having the programmed logic control 4 integrated into it may additionally be connected via a data network to a further server, which supplies data from an electricity market, in particular electricity prices for current fed into an open energy supply network 8 of an operator by the installation 1. For example, the current fed in by the installation 1 may represent a particular price, for example 0.04 to 0.06 euros, per kW of fed-in power as revenue for the user U, whilst the user U has to pay a higher price of for example 0.25 euros for drawing external current from the energy supply network 8. The method according to the invention for carrying out energy management ensures that the current generated by the user U himself or the installation 1 itself is also consumed by the installation 1 itself or the energy consumption units 6 thereof.

In a further possible variant configuration, the energy management program reads out the programmable logic control from a local data store, which for example can also be exchanged. For example, the exchangeable data store may be a USB stick or a memory card.

The method according to the invention for carrying out energy management makes it possible to control the internal energy consumption, by the energy consumption units 6 of the installation 1, of the energy generated by the energy generation unit 2. In one possible variant configuration, the control may take place during the operation of the installation 1. It is further possible for the method according to the invention to simulate the internal energy consumption in a planning phase. The simulation makes it possible to optimise the energy management program for the installation 1 in advance before setting the installation 1 in operation. The simulation may take into account further data, in particular weather forecast data or the position of the respective installation or the expected energy generation curves of the energy generation units 2 of the installation 1.

The invention claimed is:

1. A device for managing energy generated by an energy generation unit of a user's installation, the device being connected to an energy supply network and to a plurality of consumption units of the installation and comprising a programmable logic control which is adapted to control an internal energy consumption, by the energy consumption units of the installation, of the energy generated by the energy generation unit;

wherein the energy generation unit of the installation is adapted to generate energy from renewable resources, in particular from sunlight and/or by means of a fuel cell;

wherein the programmable logic control of the device is adapted to execute a stored energy management program which is programmed in a text-based or graphical programming language via a programming interface of the device; and wherein the programmable logic control of the device is adapted to control energy generated by the energy generation unit of the installation such that the total of the energy consumed by the plurality of energy consumption units of the installation is as coincident as possible with an energy progression of the energy generated by the energy generation unit, wherein the energy management program executed by the programmable logic control of the device is adapted to temporally control switching devices, which are provided between current supply lines and the energy consumption units such that the total energy consumption of all energy consumption units of the installation is made coincident with the progression of the energy generated by the generation unit, wherein the surface integral of all of the energy consumption units of the installation is brought into coincidence with the surface integral of the energy generated by the generation unit so as to maximize the internal energy consumption of the user.

2. The device according to claim 1, wherein, of the energy generated by the energy generation unit of the installation itself, the proportion which is not consumed by the energy consumption units of the installation is fed into the energy supply network or buffered in a local energy store of the installation, under the control of the programmable logic control.

3. The device according to claim 1, wherein the installation has a plurality of energy generation units which supply energy from different renewable resources; wherein the programmable logic control controls the internal energy consumption of the energy generated by the plurality of energy of energy generation units in such a way that, of the total energy generated by the energy generation units of the installation, a proportion which is consumed by the at least one energy consumption unit of the installation is a maximum.

4. The device according to claim 1, wherein the stored energy management program executed by the programmable logic control comprises a text-based instruction list or a structured text.

5. The device according to claim 4, wherein the stored energy management program executed by the programmable logic control comprises graphical functional modules, a contact plan or sequential function charts.

6. The device according to claim 1, wherein the programming interface of the programmable logic control comprises a local user interface for the user to input the energy management program and/or a remote interface for receiving the energy management program from a programming device.

7. The device according to claim 1, wherein the programming interface of the programmable logic control comprises a network interface for receiving the energy management program from a remote server.

8. The device according to claim 1, wherein the energy fed into the energy supply network and/or energy drawn from the energy supply network is detected by at least one first detection unit and reported to the programmable logic control.

9. The device according to claim 1, wherein the energy generated by the energy generation unit (2) is detected by a second detection unit (10) and reported to the programmable logic control (4).

10. The device according to claim 1, wherein the energy consumed by an energy consumption unit is detected by a third detection unit and reported to the programmable logic control.

11. The device according to claim 1, wherein operating data of the energy consumption units are transmitted to the programmable logic control via a data connection for evaluation by the energy management program.

12. The device according to claim 1, wherein configuration parameter data of the energy consumption units are inputed via the programming interface of the programmable logic control for evaluation by the energy management program.

13. The device according to claim 1, wherein a direct current generated by the energy generation unit is converted by a DC/AC converter of the device into single-phase or multi-phase alternating current, which is applied by the device to the energy consumption units of the installation to supply them with energy via the current supply lines.

14. A photovoltaic installation comprising at least one device according to claim 1.

15. The photovoltaic installation according to claim 14, wherein the device is a system component of the photovoltaic installation, in particular a photovoltaic inverter, comprising an integrated programmable logic control which is connected to a solar module of the photovoltaic installation.

16. The device according to claim 1, wherein the device comprises a network interface which is connected to a data network,
wherein a server is connected to said data network,
wherein the device is adapted to make additional information data available to the server,
said additional information data comprising configuration parameter data of the energy consumption units or configuration parameter data of energy storage units of the installation and/or geographical position data of the installation.

17. The device according to claim 16, wherein current levels generated by the energy generation unit are predicted on the basis of the geographical position data of the installation taking into account forecast data to forecast an expected energy progression of the energy generated by the energy generation unit.

18. The device according to claim 16, wherein the configuration parameter data of the energy consumption units are input via the programming interface of the device.

19. The device according to claim 16, wherein the programmable logic control of the device is adapted to download the energy management program from the server.

20. The device according to claim 1, wherein the installation is switched automatically or in response to a user input into an island operation mode in which the installation is separated from the energy supply network.

21. A method for managing energy, the energy management method comprising the steps of:
providing an energy generation unit of a user's installation;
generating energy with the energy generation unit;
providing a plurality of energy consumption units of the installation; and controlling switching devices provided between current supply lines and the energy consumption units such that the total energy consumption of all energy consumption units of the installation is made as coincident with the progression of the energy generated by the energy generation unit, wherein the surface integral of all of the energy consumption units of the installation is brought into coincidence with the surface integral of the energy generation unit so as to maximize the internal energy consumption of the user and to keep the current exchange of the energy generation unit and the energy supply network to a minimum.

22. The method according to claim 21, wherein the internal energy consumption is set by the energy consumption units of the installation using an energy management program which is executed by a programmable logic control.

23. The method according to claim 22, wherein the proportion of the energy which is not consumed by the energy consumption units of the installation is fed into the energy supply network and/or buffered in a local energy store of the installation, under the control of the programmable logic control.

* * * * *